United States Patent

Smith et al.

[11] 3,888,519
[45] June 10, 1975

[54] COUPLING AND FITTING FOR LINED TUBING

[75] Inventors: Verity C. Smith, Dedham; Lawrence H. Reynolds, Needham, both of Mass.

[73] Assignee: Vaponics, Inc., Plymouth, Mass.

[22] Filed: Nov. 16, 1972

[21] Appl. No.: 307,124

[52] U.S. Cl. .............. 285/55; 285/334.5; 285/404
[51] Int. Cl. .......................................... F16l 11/12
[58] Field of Search ....... 285/55, 334.5, 404, 332.2, 285/332.3

[56] References Cited
UNITED STATES PATENTS

| 1,724,131 | 8/1929 | Govoza | 285/404 X |
|---|---|---|---|
| 3,091,483 | 5/1963 | Hruby | 285/334.5 X |
| 3,100,656 | 8/1963 | MacArthur | 285/332.2 X |
| 3,142,499 | 7/1964 | Long | 285/55 |
| 3,268,240 | 8/1966 | Gerner | 285/55 |
| 3,284,106 | 11/1966 | McIntosh et al. | 285/55 |

FOREIGN PATENTS OR APPLICATIONS

| 631,101 | 5/1963 | Canada | 285/55 |

Primary Examiner—Dave W. Arola
Attorney, Agent, or Firm—Kenway & Jenney

[57] ABSTRACT

A leak-tight non-contaminative joint, for connecting tin lined copper tubing with a tin lined coupling member, is formed by exposing the tin lining at the tube end and inserting an elastic O-ring between the exposed lining and the surrounding coupling, so that the fluid within the tubing and coupling does not contact any metal other than tin. A clamp for holding the coupling member and tubing together is also disclosed.

10 Claims, 4 Drawing Figures

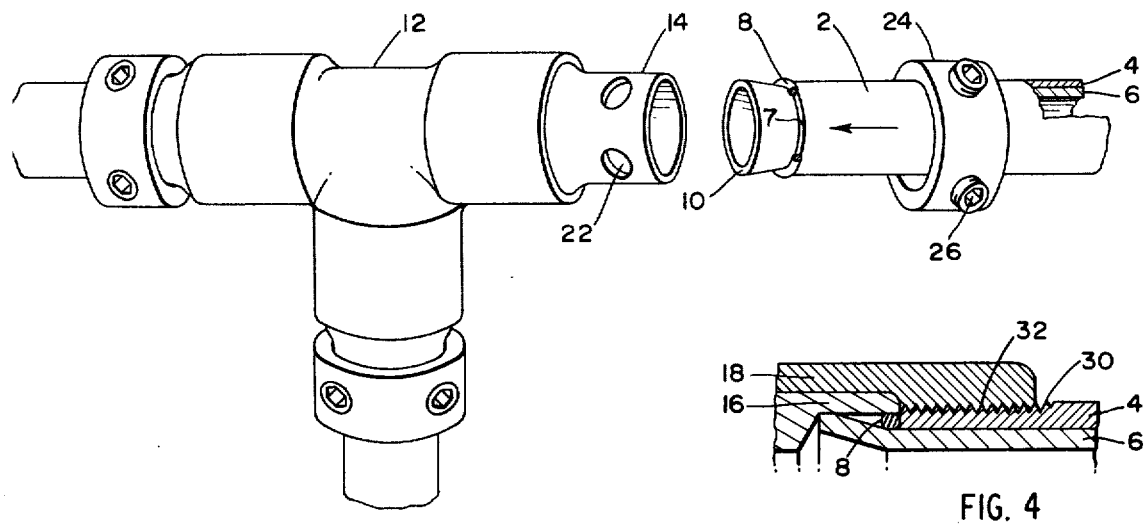
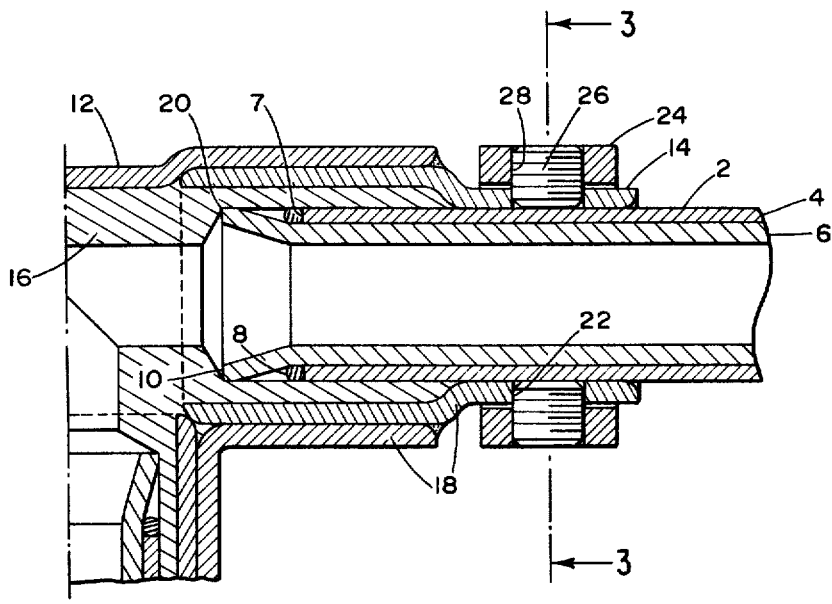
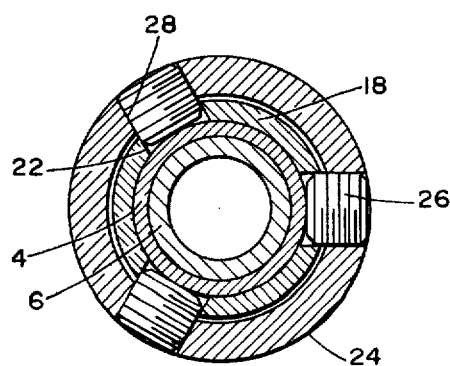

COUPLING AND FITTING FOR LINED TUBING

DESCRIPTION OF THE PRIOR ART

The present invention relates generally to fittings for coupling lined tubing, without permitting the fluid, passing through the tubing, to come into contact with the outer jacket of the tubing.

Lined pipe has been used successfully in a variety of applications where it is necessary that the pipe not contaminate or react with the fluid passing through the tubing. Typically this lining material is expensive and its structural properties are such that it is desirable to have a surrounding jacket of a stronger and less-expensive metal.

Tin lined copper pipe has been used successfully in pure water systems, since the tin does not contaminate or react with the distilled water. The copper jacket provides the necessary structural support for the substantially weaker tin, and together they provide a pipe that is substantially less expensive than a pipe made completely of tin. However in such pure water systems, it is necessary that the distilled water not come in contact with the copper jacket. For this reason a problem exists whenever one desires to connect one tin lined copper pipe with another. Obviously if one cuts one of these pipes, in order to connect it with another, as one normally does when connecting piping, the outer jacket would be exposed to the distilled water.

A common method, which has been used to join tin lined copper pipes, has been to thread the exterior copper jacket and then, by means of a threaded coupling, tightly butt the pipes together. Obviously this installation method requires precise alignment and close tolerancing, in order to prevent any possible water contamination. Furthermore, since threads must be cut into the pipe's outer jacket, it must be of a thickness considerably greater than is required for structural reasons alone. Therefore tin lined pipe systems are considerably more expensive, in terms of material and installation costs, than corresponding tin lined tubing systems would be, if practical.

Prior art devices for connecting tin lined copper tubing have also used the abutment technique and require complex threaded coupling systems, which are accurately toleranced and expensive, have proven difficult to install, and which cannot be relied upon to prevent the pure water from coming into contact with the outer copper jacket.

It is therefore desirable to provide a fitting, for coupling lined tubing that is simple and easy to install, can be used with any size copper tubing, eliminates the necessity for using of tin lined copper pipe, and will not permit the fluid, passing through the tube, to come into contact with the outer jacket.

A SUMMARY OF THE INVENTION

A cylindrical segment of the jacketing material is removed from the end of the lined tubing, to be connected to a similarly lined coupling. An O-ring formed of a flexible, compressible material, which will not contaminate or react with the fluid passing through the tubing is slipped over the completely exposed inner lining, until it abuts the end of the outer metal jacket. The inner lining is then slightly flared and the tubing is now inserted into a female receptacle of the lined coupling. The tubing is inserted until a cylindrical segment of the remaining outer jacket of the lined tubing is enclosed by the female receptacle and the O-ring has formed a fluid tight seal between the receptacle and the exterior surface of the exposed inner lining. The enclosed outer portion of the lined tubing is clamped to the receptacle, providing a direct load path through the outer metal jacket of the lined tubing and the lined coupling. This arrangement does not require threaded joints, it can be used for any sized tubing and is simple and easy to install. In view of its superiority over prior art methods, this arrangement makes practical the use of tin lined tubing, of any size, in pure water systems, thereby providing a system that is cheaper and lighter than previous tin lined copper systems and which will not contaminate or react with the distilled water passing through it.

BRIEF DESCRIPTION OF THE DRAWING

The several features and advantages of this lined tubing fitting arrangement, constructed in accordance with the invention, will be more readily understood and appreciated from the following detailed description of the preferred embodiments, herein selected for purposes of illustration, as shown in the accompanying drawing in which:

FIG. 1 is a perspective view of a coupling for lined tubing and a lined tubing, constructed in accordance with the invention;

FIG. 2 is a front elevational view, partly in section, of a lined tubing fitting, constructed in accordance with the invention;

FIG. 3 is a side elevational view, partly in section, of a clamping device suitable for use in a lined tubing fitting constructed in accordance with the invention; and FIG. 4 is a front elevational view, in section, of a lined pipe fitting, constructed in accordance with the invention.

DESCRIPTION OF PREFERRED EMBODIMENT

As shown in FIG. 1 a lined tubing 2 has an outer supporting jacket 4 for an inner lining 6. Tubing 4 and lining 6 are constructed of dissimilar materials and are concentric tubes fit together by means well-known in the art. A cylindrical segment of tube 4 has been removed, by a standard pipe cutter for example, to expose completely lining 6, allowing it to protrude from end 7 as indicated at 10. An elastic and compressible O-ring 8 has been slipped over the protruding portion 10 until it abuts end 7 of outer-tubing 4. The protruding portion 10 has been slightly flared, to hold the O-ring in place. Also shown in FIG. 1 is a lined coupling 12 having a female receptacle 14 for receiving tubing 2. A lubricant, soluble in the fluid which will pass through tubing 2, may be applied to permit easier insertion of the end of tubing 2 into receptacle 14.

Referring to FIG. 2, tubing 2 had been completely inserted into lined coupling 12. Coupling 12 has an exterior jacket 18 which, for purposes for this preferred embodiment, will be assumed to be of the same material as outer-tubing 4 of tubing 2, and has an interior lining of material 16 which, for purposes of this preferred embodiment, will be assumed to be the same material as inner lining 6 of tubing 2. For pure water systems, it is preferrable that materials forming linings 6 and 16 be of pure tin while, for strength and cost reasons, materials forming jackets 4 and 18 are preferrably copper.

Tubing 2 has been inserted until a cylindrical segment of outer-tubing 4 is partially within receptacle 14 and O-ring 8 has been compressed to form a fluid tight seal between lining 16 of the receptacle and the outer surface of inner lining 6. As noted above, the protruding portion of the inner lining 6 is flared as indicated at 10. The outer most portion of the flared portion 10 should be of equivalent dimensions with the outer surface of tubing 2. For purposes of this embodiment, end 10, of lining 6, has come to rest at shoulder 20 of lining 16 within coupling 12.

O-ring 8 is composed of an elastic and compressible material which will not react with or contaminate the fluid passing through tubing 2, and is of such a thickness that, with tubing 2 fully inserted, O-ring 8 has been tightly compressed against end 7 of outer-tubing 4, lining 16 of receptacle 14 and the outer surface of the inner lining 6. The fluid pressure against O-ring 8, further compresses it against end 7 of outer-tubing 4, thereby providing an even tighter seal. In this manner, the fitting of this invention prevents any fluid, passing through tubing 2, from leaking from coupling 12 or coming into contact with either outer-tubing 4 or jacket 18 of coupling 12. Therefore it can be seen that fluid passing through tubing 2 and coupling 12 will only come into contact with non-contaminating, non-reactive surfaces.

Receptacle 14 is shown with jacket 18 extending beyond lining 16 and coming into direct contact with the outer-tubing 4 of tubing 2. With the outer-tubing 4 directly attached to jacket 18, any loading imposed on the coupling will be transmitted through the structurally stronger jacketing materials. For purposes of this preferred embodiment, a clamping device 24 is shown for attaching tubing 2 to coupling 12.

Referring to FIG. 3, an outer ring 24 is shown placed concentrically about receptacle 14 beyond lining 16, with symmetrically arranged and radially directed, threaded holes 28 extending through it. Receptacle 14 has holes 22 which are concentrically aligned with holes 28 in ring 24. Set screws 26 threadedly engage holes 28 and pass through holes 22, until they come to bear against outer-tubing 4 of tubing 2. These screws also press against the sides of holes 22 in jacket 18 and thereby provide a direct load path between jacket 18 of coupling 12 and outer-tubing 4 of tubing 2. This arrangement insures that all loads, imposed on the coupling, will be transmitted through the structurally stronger jacketing materials. Obviously coupling 12 could be a cast fitting, or be constructed so that jacket 18 is thick enough to receive set screws 28. In this latter modification holes 22 would of course be threaded and clamping device 24 would not be needed. Other means, such as belt clamps or strong adhesives should also prove satisfactory as an attachment mechanism between tubing 2 and coupling 12.

While our invention is especially attractive to users of lined tubings, it is also suitable for coupling any type of lined conduits. For example, referring to FIG. 4, coupling 12 could be cast, with jacket 18 considerably thicker. Outer-tubing 4 could be a pipe. Pipe 4 and jacket 18 would be threaded with matching threads as shown respectively at 30 and 32. In this arrangement no clamping device would prove necessary and since O-ring 8 still provides a seal between lining 16 and the exposed portion of lining 6, this arrangement would provide a non-contaminative coupling for lined pipes that does not require precise tolerancing.

Our invention is particularly suitable for tin lined copper tubing, where outer-tubing 4 and jacket 18 are formed from copper and linings 6 and 16 are formed from tin. Thus it can be seen that it is no longer necessary to employ tin lined copper piping in order to obtain a satisfactory joint. Fittings constructed in accordance with our invention are simple to install using standard tools, yet provide leak-proof and contamination-free couplings. Therefore our invention makes practical the use of lined copper tubing, of any size, in pure water systems, thereby greatly reducing the weight and expense of such systems.

It should be understood, of course, that the foregoing disclosures relate only to the preferred embodiment of the invention and that it is intended to cover all changes and modifications of the example of the invention herein chosen, within the purposes of the disclosures, which do not constitute departures from the spirit and scope of the invention.

Having now described and illustrated a preferred embodiment of my invention, what we claim as new and desire to secure by letters patent of the United States is:

1. In a joint for coupling and fitting; a coupling member having a female receptacle with an inner surface formed of a non-contaminating material to a lined conduit having an inner lining of a non-contaminating material and an outer-tubing formed of a material dissimilar to said non-contaminating material which is chosen to provide structural support, where the improvement comprises:

said coupling member enclosing a cylindrical segment of said outer-tubing;

said inner lining of non-contaminating material of said conduit extending beyond the end of said outer-tubing;

the non-contaminating material of said female receptacle forming a shoulder within said receptacle;

said non-contaminating lining of said conduit contacting the non-contaminating material of said shoulder;

a sealing member formed of a non-contaminating material abutted against the end of said outer-tubing, said flexible sealing member providing a fluid tight seal between the non-contaminataing material of said receptacle and the non-contaminating material of said inner lining so that fluid flowing through said joint only contacts non-contaminating material; and, a ring located about the portion of said coupling member enclosing the cylindrical segment of said outer-tubing, said ring having a plurality of symmetrically located, threaded, radially directed holes therethrough;

said coupling member also defining holes which are concentrically aligned with the threaded holes in the ring; and, set screws threaded into said threaded holes in said ring and extended through said holes in said coupling member and bearing against the exterior surface of said outer-tubing.

2. In a joint for coupling and fitting; a coupling member having a female receptacle with an inner surface formed of a non-contaminating material having a shoulder defined therein and an outer jacket formed of material which is structurally stronger than the non-contaminating material of said female receptacle, the coupling member being coupled to a lined conduit having an inner lining of a non-contaminating material and an outer-tubing formed of a material dissimilar to said non-contaminating material of said inner lining of said lined conduit, which dissimilar material is chosen to provide structural support, wherein the improvement comprises:

said female receptacle of said coupling member enclosing a cylindrical segment of said outer-tubing to form the joint and means attaching said outer jacket to said outer tubing to hold the joint in assembled relationship;

said inner lining of non-contaminating material of said conduit extending beyond the end of said outer-tubing into the coupling member;

the non-contaminating lining of said conduit contacting the non-contaminating material of said shoulder; and, a flexible sealing member formed of a non-contaminating material abutted against the end of said outer-tubing, said flexible sealing member providing a fluid tight seal between the non-contaminating material of said receptacle and the non-contaminating material of said inner lining so that fluid flowing through said joint only contacts non-contaminating material.

3. The joint as set forth in claim 2 wherein the end of the non-contaminating material of said inner lining which extends beyond the end of said outer-tubing is flared.

4. The joint as set forth in claim 3 wherein the flared end of said inner lining is substantially congruent with the outer surface of said outer-tubing.

5. The joint as set forth in claim 2 wherein the non-contaminating material of the coupling member and the non-contaminating material of the inner lining of the conduit is the same material.

6. The joint as set forth in claim 5 wherein said non-contaminating material is tin.

7. The joint as set forth in claim 2 wherein the non-contaminating material of said inner lining of said conduit is tin and wherein the outer-tubing is formed of copper.

8. The joint as set forth in claim 7 wherein the inner surface of the female receptacle is formed of tin.

9. The joint as set forth in claim 8 wherein the sealing member is an O-ring.

10. The joint as set forth in claim 2 wherein said means includes a clamp for clamping said joint, said clamp being positioned over said outer jacket to attach said outer jacket to said outer tubing and thereby hold the joint in assembled relationship.

* * * * *